United States Patent
Stempler et al.

[15] 3,636,364
[45] Jan. 18, 1972

[54] RADIATION SENSITIVE DESYNCHRONIZATION DETECTION SYSTEM

[72] Inventors: Samuel Stempler, Brooklyn; Carl A. Listl, New Hyde Park; Leonard Baron, Syosset, all of N.Y.

[73] Assignee: Kollsman Instrument Corporation, Syosset, N.Y.

[22] Filed: Sept. 19, 1969

[21] Appl. No.: 859,417

[52] U.S. Cl. ...........................250/220 R, 250/236, 250/209, 340/268, 318/85
[51] Int. Cl. ...................................................H01j 39/12
[58] Field of Search...............256/219 I, 222, 233, 236, 221, 256/223, 232; 340/268, 271; 318/70, 85, 313; 250/231 SE, 202, 219, 209, 236, 215, 217 SS; 356/138

[56] References Cited

UNITED STATES PATENTS

| | | | |
|---|---|---|---|
| 2,499,178 | 2/1950 | Berry et al. | 250/202 X |
| 2,961,547 | 11/1960 | Snavely | 250/202 X |
| 3,012,468 | 12/1961 | Magill et al. | 356/138 |
| 3,056,029 | 9/1962 | Budnick | 356/169 |
| 3,529,200 | 9/1970 | Potter et al. | 250/217 SS |
| 3,551,682 | 12/1970 | Kerhoas et al. | 252/217 SS |
| 3,370,174 | 2/1968 | Toussaint | 250/217 SS |
| 3,179,870 | 4/1965 | Maxey | 318/313 |
| 3,204,532 | 9/1965 | Budnick | 318/313 |
| 3,311,803 | 3/1967 | Schulz | 318/85 |
| 3,454,777 | 7/1969 | Marcus | 250/219 |
| 3,462,607 | 8/1969 | Heinz | 250/233 |

*Primary Examiner*—Walter Stolwein
*Attorney*—E. Manning Giles, J. Patrick Cagney and Peter S. Lucyshyn

[57] ABSTRACT

A method and apparatus for detecting the incidence of rotational desynchronization between a pair of rotating body portions are disclosed herein. The apparatus includes an optical transmitter having an aperture for directing a beam of light energy at a rotating body portion. A modulator wheel assembly is rigidly connected to the rotating body for rotation therewith and positioned thereon to intercept and intermittently reflect the beam along a predetermined axis. A photosensor is located along the axis which is responsive to the intermittently reflected beam to provide a high-resolution pulse train having a frequency proportional to the rotational speed of the rotating body portion. A pulse train is produced in the above manner for each of the rotating body portions. Electronic circuitry is provided for comparing the phase of the pulse trains and an error signal is generated when the phase difference between the pulse train reaches a predetermined magnitude.

5 Claims, 14 Drawing Figures

PATENTED JAN 18 1972 3,636,364

INVENTORS
Samuel Stempler
Carl A. Listl
Leonard Baron
BY *J. Patrick Cagney*
ATTY.

PATENTED JAN 18 1972

INVENTORS
Samuel Stempler
Carl A. Listl
Leonard Baron

BY J. Patrick Cagney
ATTY

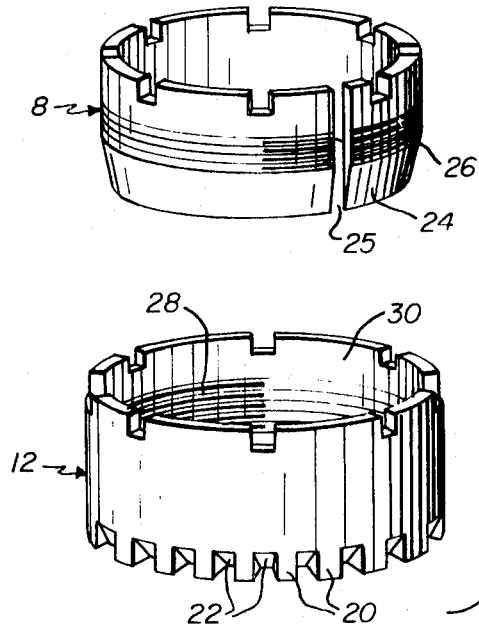
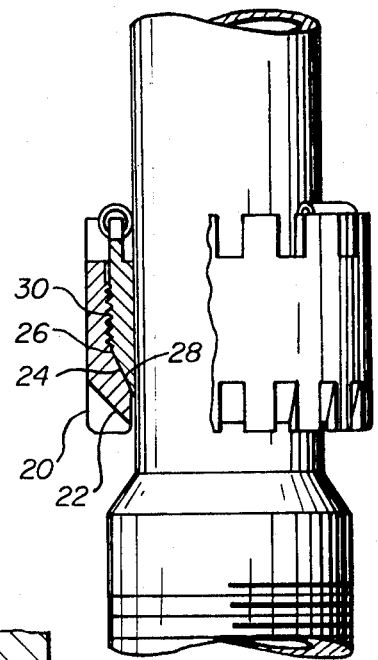
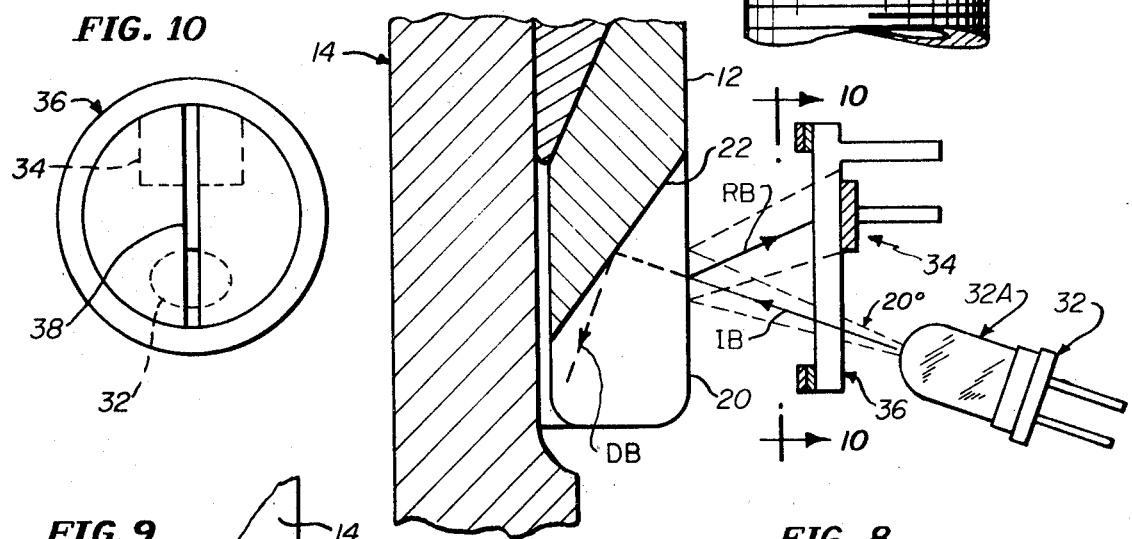
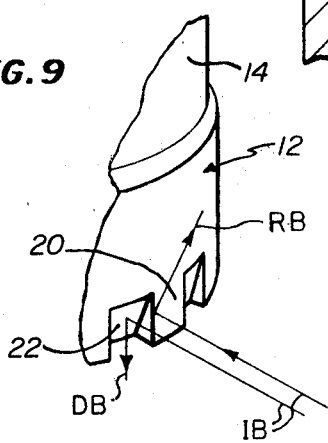
FIG. 6
FIG. 7
FIG. 10
FIG. 9
FIG. 8
INVENTORS
Samuel Stempler
Carl A. Listl
Leonard Baron
BY J. Patrick Cagney
ATTY.

INVENTORS
Samuel Stempler
Carl A. Listl
Leonard Baron
BY J. Patrick Cagney
ATTY.

3,636,364

RADIATION SENSITIVE DESYNCHRONIZATION DETECTION SYSTEM

BACKGROUND OF THE INVENTION

Numerous situations exist where it is desirable to determine quickly and accurately the degree to which a pair of shafts are rotating in synchronized fashion. Similarly there is a need for a method to determine the incidence and amount of rotational desynchronization between two portions of a single rotating shaft (for example, in determining the torque applied to the shaft.)

SUMMARY OF THE INVENTION

In accordance with the present invention a desynchronization detection system includes optical transmitters for directing beams of radiant energy at each rotating body portion to be monitored. A modulator wheel assembly is rigidly connected to each of the portions for rotation therewith and positioned thereon to intercept and intermittently reflect the beams, respectively, along predetermined reflected beam axes. Photosensitive detectors are individually positioned along each one of the axes which are responsive to the intermittently reflected radiant beams to provide first and second high resolution pulse trains, the first pulse train being of a frequency proportional to the rotational speed of one of the rotating portions and the second pulse train being of a frequency proportional to the rotational speed of the other of the portions. Electronic circuitry is provided to compare the relative phase difference between the pulse trains, which phase difference represents the amount of desynchronization between the two rotating body portions.

In accordance with the more particular aspect of the present invention, an optical modulator wheel assembly comprises a sleevelike modulator wheel element having an exterior surface providing a circular array of optical reflection surfaces, and a sleevelike clamp element in telescoping relatively axially shiftable relation to said wheel element. The elements have complimentary outer and inner conical portions interengageable upon relative axial movement to cause the inner portion to grip the shaft. The elements further are provided with mating exterior and interior surfaces whereby relative rotation of the elements produces corresponding relative axial movement.

A method for detecting the incidence of rotational desynchronization between a pair of rotating body portions in accordance with the present invention, consists of sequentially reflecting each of a pair of beams of energy having been directed at each of the rotating body portions, so that the number of reflections and the duration of each reflection of each of the beams per unit time is proportional to the speed of rotation of a corresponding of the rotating body portions, converting the sequentially reflected beams of radiant energy to a corresponding pair of high resolution electrical pulse trains, each being of a frequency proportional to the speed of rotation of a corresponding of the rotating body portions, and sensing the incidence of relative phase difference between the pair of pulse trains.

Other features and advantages of the invention will be apparent from the following description and claims and are illustrated in the accompanying drawings which show structure embodying preferred features of the present invention, and the principles thereof, and what is now considered to be the best mode in which to apply these principles.

DETAILED DESCRIPTION OF THE DRAWINGS

In the accompanying drawings forming a part of the specification, and in which like numerals are employed to designate like parts throughout the same:

FIG. 6 is an exploded perspective view of the modulator wheel element and sleevelike clamp element which together comprise the modulator wheel assembly of the present invention;

FIG. 7 shows a helicopter rotor shaft with the modulator wheel assembly affixed thereto, the modulator wheel assembly being partially cut away to show the interlocking engagement of the modulator wheel element and sleevelike clamping element;

FIG. 8 is a fragmentary view showing the positional relationship between the optical transmitter, optical detector, and modulator wheel element;

FIG. 9 is a fragmentary view of the modulator wheel element and indicating the incident, reflected, and deflected beam paths;

FIG. 10 is a view of the aperture disc as it would be seen from a point directly in front of the modulator wheel element;

DESCRIPTION OF THE PREFERRED EMBODIMENT

For purposes of illustrative disclosure, the method and apparatus comprising the desynchronization detection system of the present invention will be described as it may be applied to detect the incidence of rotational desynchronization between the two rotors of a dual rotor helicopter.

Figure 1:
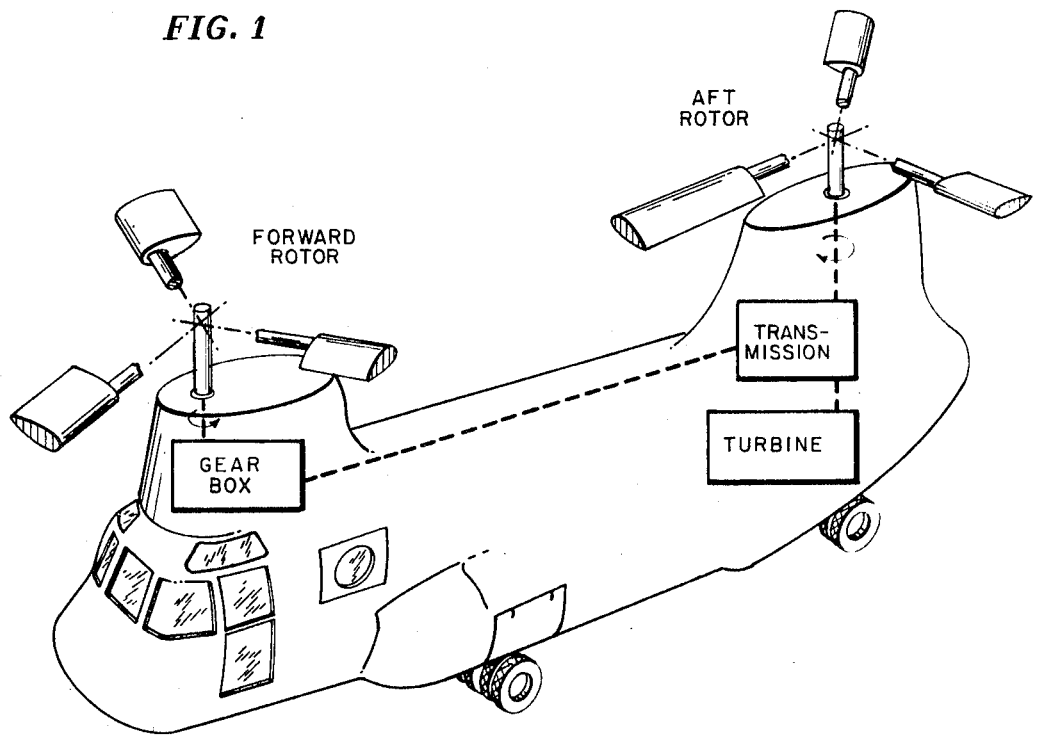
FIG. 1 is a perspective view of a dual rotor helicopter utilizing the desynchronization detection system in accordance with the present invention.

As indicated in FIG. 1, the dual rotors are normally synchronized by virtue of common shafting and gearing. The blades on the forward and aft rotors overlap but are staggered (similar to meshed gear teeth) for clearance. During forward speed and/or certain yaw maneuvers, the forward and aft blades will tilt into the same plane of rotation. If under these circumstances a failure, due to battle damage and/or other causes, occurs in either of the rotor systems (for example, either in the transmission or in the coupling shafting), the rotors will lose synchronization causing the blades to strike each other, and thereby avalanche the original damage, perhaps catastrophically. To prevent such an occurrence, the desynchronization detection system of the present invention can be utilized.

In order for any desynchronization detection system to be effective, it must detect a failure mode, (such as described above) in its incipient stages, while there is still time to tilt the blades sufficiently to avoid blade impact. A critical system requirement, therefore, is the ability to reliably detect abnormal deviations from synchronization while the relative angular displacement of the rotating body portions (i.e., rotors) is still quite small, and to transmit this information rapidly enough to permit corrective action to be taken.

In accordance with the present invention, a pair of optical sensor assemblies, one for each rotating body portion (rotor) to be monitored, are utilized to generate a corresponding pair of identical pulse trains, (that is, separate first and second original sequences of electrical pulses) each pulse trains having a frequency which is proportional to the speed of rotation of a corresponding of the rotors. Each pulse of each pulse train is of equal width and corresponds to an angular segment of monitored rotor, each segment being of equal size. The two pulse trains are initially phase aligned at a time when it is known that the rotors are, in fact, in synchronization. During operation of the aircraft, desynchronization between the rotors will be reflected as a phase difference between the two pulse trains, the relative phase difference being proportional to the amount of desynchronization between the two rotors. A signal can then be automatically triggered in response to a predetermined phase difference of the pulse trains so that corrective action can be taken.

Figure 2:
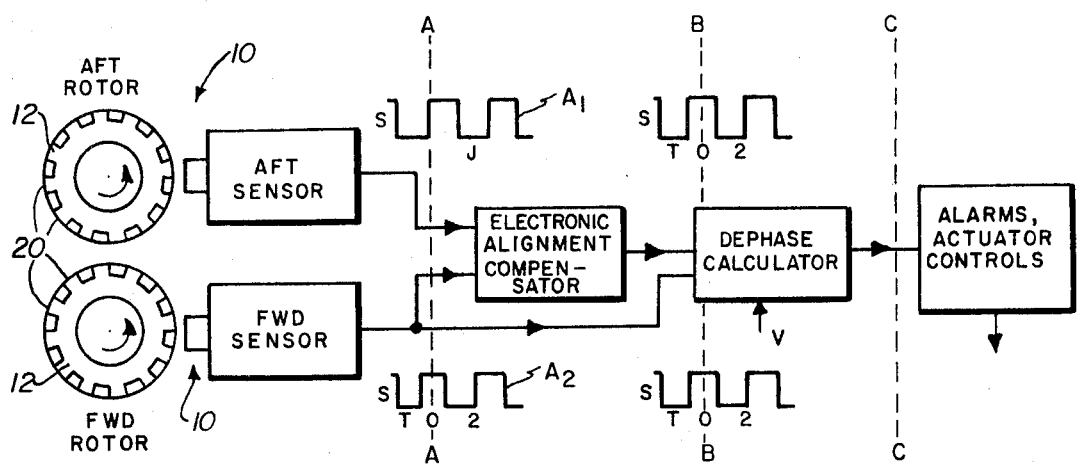
FIG. 2 is a schematic and functional diagram showing both the optical and electrical components of the desynchronization detection system of the present invention.

Referring now to FIG. 2, there is diagrammatically shown the method by which the detection system of the present invention operates to detect relative positional shaft desynchronization between a pair of rotors. As shown in FIGS. 2 and 9, a pair of optical sensor assemblies 10 each direct an incident beam (IB) of energy toward a corresponding rotor. Clamped to each rotor for rotation therewith is a modulator wheel element 12 having an exterior surface providing a circular ray of optical reflection surfaces 20. Each wheel element 12 is positioned so that, as the rotor turns, the reflecting surfaces 20 of the modulator wheel element 12 sequentially reflects an incident beam, IB. As will be explained in greater detail below, each optical sensor assembly 10 includes an optical detector which is responsive to the sequentially reflected beam (RB) to provide a pulse train having a frequency which is proportional to a rotor r.p.m.

Such a pulse train is generated for each rotor (forward and aft). If each of the two optical sensors and their corresponding modulator wheel elements 20 are accurately aligned identically relative to one another, the two generated pulse trains would be in phase. However, as a result of misalignment during installation of the optical sensor assemblies and aircraft gearing tolerances, the leading edge of the two pulse trains may not coincide. Therefore, an electronic adjustment is provided to null the system under dynamic conditions. This is accomplished, as shown in FIG. 2, by feeding the two generated pulse trains through an electronic alignment compensator which operates to delay the leading edge of the leading pulse train until it coincides with the leading edge of the lagging pulse train. For example, the two pulse trains may appear as indicated in FIG. 2 prior to alignment at the point A—A where the pulse train $A_1$ is shown to be lagging the pulse train $A_2$ (due to sensor assembly misalignment or gearing tolerance). As stated above, the electronic alignment compensator operates to introduce a constant phase delay to one of the two input signals. This delay is manually adjusted upon initial installation of the desynchronization detection system) so as to exactly compensate for any mechanical misalignment of the sensors. When properly adjusted the electronic alignment compensator provides to the following circuitry two pulse trains which are always in phase when the rotors are in phase.

The square waves from the electronic alignment compensator, now in phase as shown in FIG. 2 at point B—B, then are sent through a dephase calculator unit which performs a logical difference of the two pulse trains that yields a third pulse train, the duty cycle of which is proportional to the phase difference of the rotor shafts. That is, a third pulse train is generated by the dephase calculator unit having pulses, the width of which are proportional to the amount of desynchronization between the rotors. The third pulse train is sent to an alarm actuator control which is operable to signal an alarm when the relative angular positions of the two rotors are out of phase greater than some predetermined amount, for example 4.5° (mechanical).

Figure 3:
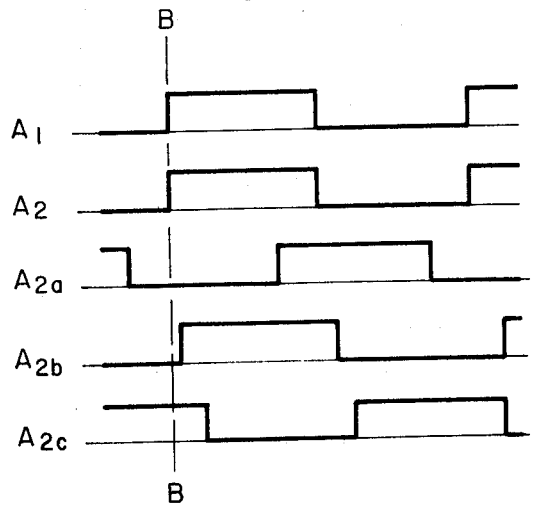
FIG. 3 shows a series of typical wave forms as they would appear along line B—B of FIG. 2 just prior to the operation of the dephase calculator.

Turning to FIG. 3, there is shown a series of typical wave forms generated by the sensor assemblies 10, as they would appear after initial alignment by the electronic alignment compensator and just prior to entry to the dephase calculator at point B—B of FIG. 2.

It will be noted that each of the pulse trains shown is comprised of square waves having pulse widths of 180° (electrical). This, as will be described in greater detail below, results from the fact that the reflecting surfaces 20 of the modulator wheel element 12 are of equal size and are each separated by an amount equal to the size of each surface 20. It will be noted that if 30 reflecting surfaces 20 are equally spaced about a modulator wheel element 12, then 360° (electrical) corresponds to 12° (mechanical) and a phase difference between the two pulse trains of 30° (electrical) corresponds to a relative angular phase difference between the shaft position of the rotors of 1° (mechanical).

Figure 4:
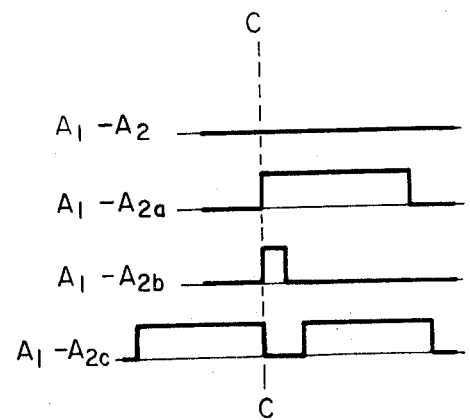
FIG. 4 shows a series of wave forms corresponding to the wave forms of FIG. 3 as they would appear along line C—C of FIG. 2 prior to entry to the alarm actuator.

Examining the wave forms of FIG. 3, it will be seen that pulse trains $A_1$ and $A_2$, after initial alignment, are in phase. The pulses of these two pulse trains, by a logical differencing operation performed by the dephase calculator, are cancelled (as shown in FIG. 4 indicated as $A_1-A_2$). If some damage occurs to the aircraft, causing the rotors to lose synchronization, the pulse trains entering the dephase calculator will not be in phase. For example, pulse train $A_1$ could be leading pulse train $A_{2a}$ by 135° (electrical), as shown in FIG. 3. The dephase calculator operates on such out-of-phase pulse trains to produce an output pulse train, the pulses of which have a width of 135° (electrical) as indicated in FIG. 4 as the pulse $A_1-A_{2a}$. In a similar manner the dephase calculator operates on entering wave trains $A_1$, $A_{2b}$ and $A_1$, $A_{2c}$, to provide respective pulses as indicated in FIG. 4 as pulses $A_1-A_{2b}$ and $A_1-A_{2c}$.

As mentioned above, the pulses of the pulse train generated by the dephase calculator are sent to an alarm actuator control. If, as stated above a rotor phase difference of 4.5° (mechanical) is the maximum allowable rotor desynchronization, the alarm actuator control will be set to operate to signal an alarm upon receiving a pulse having a width of 135° (electrical).

OPTICAL SENSOR ASSEMBLY DETAILED DESCRIPTION

As described previously, each of the pulse trains used to monitor the relative rotor shaft phase position is generated by an optical sensor assembly 10, which operates to sequentially reflect a beam of light energy, directed at one of the rotor shafts, so that the number of reflections per unit time is proportional to the speed of rotation of the rotor.

Referring to FIG. 8, the components of an optical sensor assembly 10 are shown to include an optical transmitter 32, an optical detector 34, and a modulator wheel element 12.

The transmitter 32 and detector 34 are both supported within a housing 11 (FIGS. 5 and 8) having an aperture disc 36 providing a narrow slit 38 (FIG. 10). As best shown, in FIG. 5, each housing 11 is mounted adjacent a rotor 14 by means of a shroud 16 so that the aperture disc 36 faces the rotor with the slit 38 longitudinally aligned with the axis of the rotor 14.

The particular optical transmitter 32 shown is a MaAs infrared emitting diode which is excited by a constant current source. The detector 34 shown is a silicon solar cell, the spectral response of which peaks at 0.9 microns which matches the peak spectral output of the MaAs source.

When the infrared emitting diode is excited, the aperture disc 36 permits a narrow beam IB of light energy to escape the housing 11 in a direction toward the rotor shaft 14. As will be explained in greater detail below, the beam IB, prior to reaching the rotor shaft 14, is intercepted by the modulator wheel element 12, which upon rotation operates to alternately reflect the beam toward and deflect the beam away from the optical detector 34.

Each time a beam of light energy RB is reflected to the optical detector 34 a negative signal will be generated. When no light is received, the signal is zero. As the modulator wheel element 12 rotates the signal alternates between the two levels. Each of the sensors include amplifying electronics which operates on the signal supplied by the detector 34 in such a manner as to effect, at the electronics output, a voltage which is an accurate, quantisized replica of the modulator wheel element 12 rotating before the sensor. Numerous photodetectors are commercially available which are capable of performing the above operation. Suffice it to say that the electronics consists of an amplifier with a band limiting and a threshold detector (comparator). To enhance signal and amplifier properties, a DC restorer or clamping circuit is interposed between the amplifier and the threshold detector.

Figure 5:
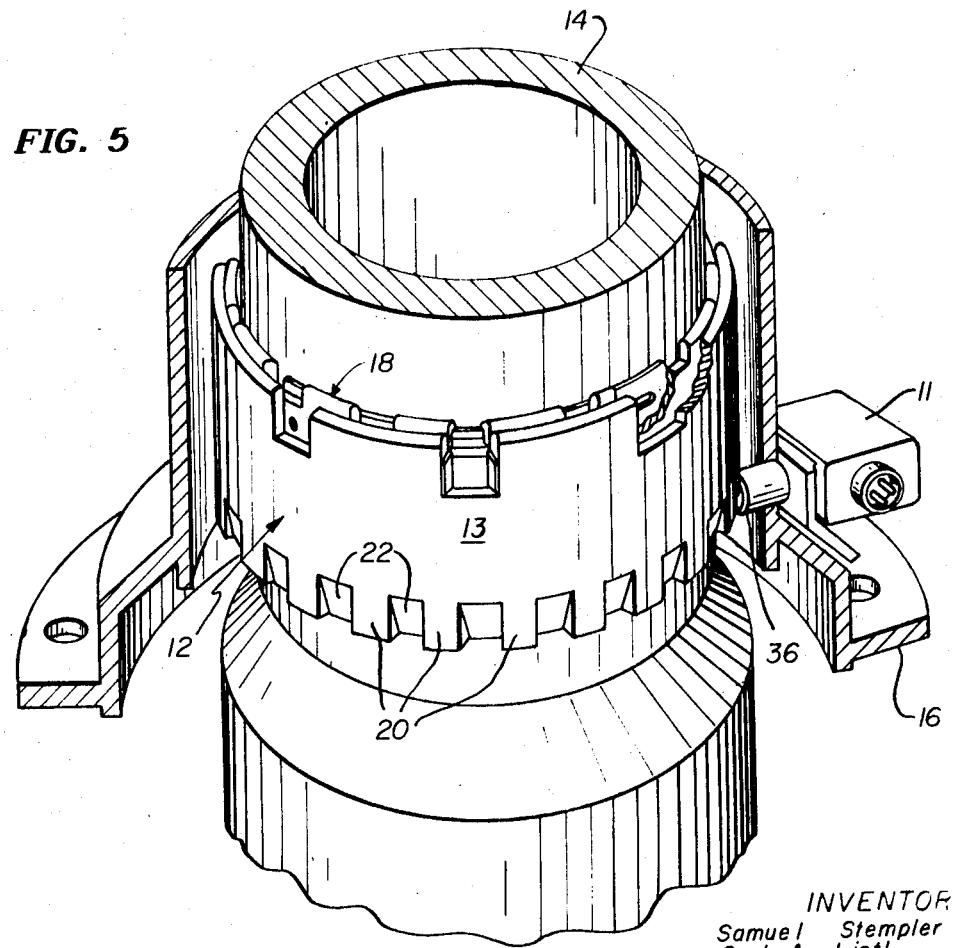
FIG. 5 is a perspective view of the modulator wheel assembly secured to one of the rotors of the helicopter of FIG. 1 and showing the optical sensor assembly housed and mounted adjacent thereto.

The component of the sensor assembly for controlling the path of the light energy consists of a modulator wheel element 12 which is rigidly fastened to a rotor shaft and which separates the shaft from the optical transmitter and detector components. Referring to FIGS. 5 to 7, the modulator wheel element 12 is shown to be the outer member of a two piece modulator wheel assembly 13, the other member being a sleevelike clamp element 18 which serves to secure wheel element 12 to the shaft.

The modulator wheel element 12 is shown having an exterior surface providing a circular array of optical reflection surfaces 20. Each of the surfaces 20 is of a uniform size and separating each of the surfaces 20 and alternating therewith is a series of deflecting surfaces 22 of uniform size. The angular lengths of the reflecting surfaces 20 and deflecting surfaces 22 are shown to be equal. As best shown in FIG. 9, such results in the incident beam IB being alternately reflected and deflected over equal increments of time regardless of the speed of rotation of the modulator wheel element 12.

As best shown in FIGS. 6 and 7, the sleevelike clamp element 18 consists of a split nut structure having an external threaded portion 26 and an external tapered or conical portion 24. The modulator element 12 is shown to have an internal threaded portion 30 for threadlike engagement with the external threaded portion 26 of clamp element 18. Likewise, modulator wheel 12 has an internal tapered or conical portion 28 for wedging engagement with the conical portion 24 of the clamp element 18.

Mounting of the modulator wheel element 12 to a rotor shaft is accomplished by sliding the modulator wheel element 12 and then the clamp element 18 on to a rotor shaft after which the clamping element 18 is screwed into the modulator wheel element 12 while applying a predetermined torque. By advancing the clamp 18 into the modulator wheel 12 the tapered end of the clamping element is forced against the shaft 14 and the gap 25 in the clamping element 18 is reduced. It will be noted that the interengagement of the conical portions 24, 28 corrects for diameter differences occurring from shaft to shaft, thus positioning the modulator wheel element 12 at a proper distance from the optical sensor unit 10.

Several significant advantages result by using the modulator wheel assembly comprising one aspect of the present invention, including the following:
a. the ease with which the installation can be accomplished without removing the rotor shaft;
b. the simplicity of the fabricated parts (only 2 pieces);
c. the safety and secureness of the installation;
d. the ease with which the parts can be removed (and reused) when maintenance of the rotor shaft is required;
e. insignificant stresses are coupled to the rotor shaft;
f. normal aircraft mechanical skills are all that is required.

The optical sensor assembly 10 of the present invention has proven to be capable of tolerating radial and axial shaft vibrations without an ensuing deterioration of its sensitive data.

As stated hereinabove, an effective desynchronization detection system for use in the helicopter application described herein must accurately detect a failure mode in its incipient stages. Such demands that high resolution wavetrains be generated which requires that the risetime of the square waves be extremely rapid. For the helicopter application, the risetime should be sufficiently rapid as to give rise to an error of no more than 0.15° (mechanical), approximately 0.002 seconds.

In the specific detection system described for use in detecting a failure mode in a helicopter, the optical transmitter 32 is a Monsanto type MI 20 CX 01 MaAs diode. The optical detector 34 is a silicon PN device operated in the photovoltaic mode (which eliminates the need for a power supply to provide back bias required when operating photoconductively).

The optical geometry utilized in the specific embodiment described to achieve the desired risetime is shown in FIG. 8. While only a single aperture plate 36 is shown, it will be noted that it is effectively two apertures since the light must make a double pass through it, once before the signal is modulated and once again after it is modulated just before it is incident on the detector. A high magnification lens 32A condenses the diode radiation (normally $2\pi$ radians) into a 20° included angle cone (FIG. 8). It will be noted that a light beam width, at the modulator wheel, of 0.008 inches corresponds to a 0.15° (mechanical) error so that, in the embodiment described, wherein the modulator wheel reflecting surface 20 is approximately two-thirds the distance from the optical source to the optical detector, the slit width is 0.010 inches. The slit 38 shown has a length of 0.312 inch and the optical detector a length of 0.156 inch, thereby occupying one-half the overall slit length.

DESCRIPTION OF THE ELECTRONICS COMPRISING THE ELECTRONIC ALIGNMENT COMPENSATOR, DEPHASE CALCULATOR, AND ALARM ACTUATOR CONTROL

The specific embodiment of the optical sensor assembly described above operates to provide a pair of pulse trains, each consisting of a series of square waves having a half-cycle of 180° (electrical). For purposes of illustrative disclosure, the particular electronics which may be utilized to perform the alignment, dephase calculation, and alarm functions with pulse trains of this type will now be discussed.

ELECTRONIC ALIGNMENT COMPENSATOR

As stated above, the electronic alignment compensator (hereinafter referred to as the EAC is used to compensate for mechanical misalignments incurred in the initial installation of the modulator wheel assemblies 12 to the rotor shafts and the housing 11 to the shroud. The function of the EAC then, is to delay in phase the leading phase sensor signal (of a pair) by an amount equal exactly to the phase difference in the sensor signals due to the mechanical offset. When properly adjusted the EAC output provides two signals which are in phase when the rotors are in phase and when the rotors are not in phase, outputs two signals which are out of phase by an amount directly proportional to the amount of desynchronism present in the rotor shafts.

Figure 11:
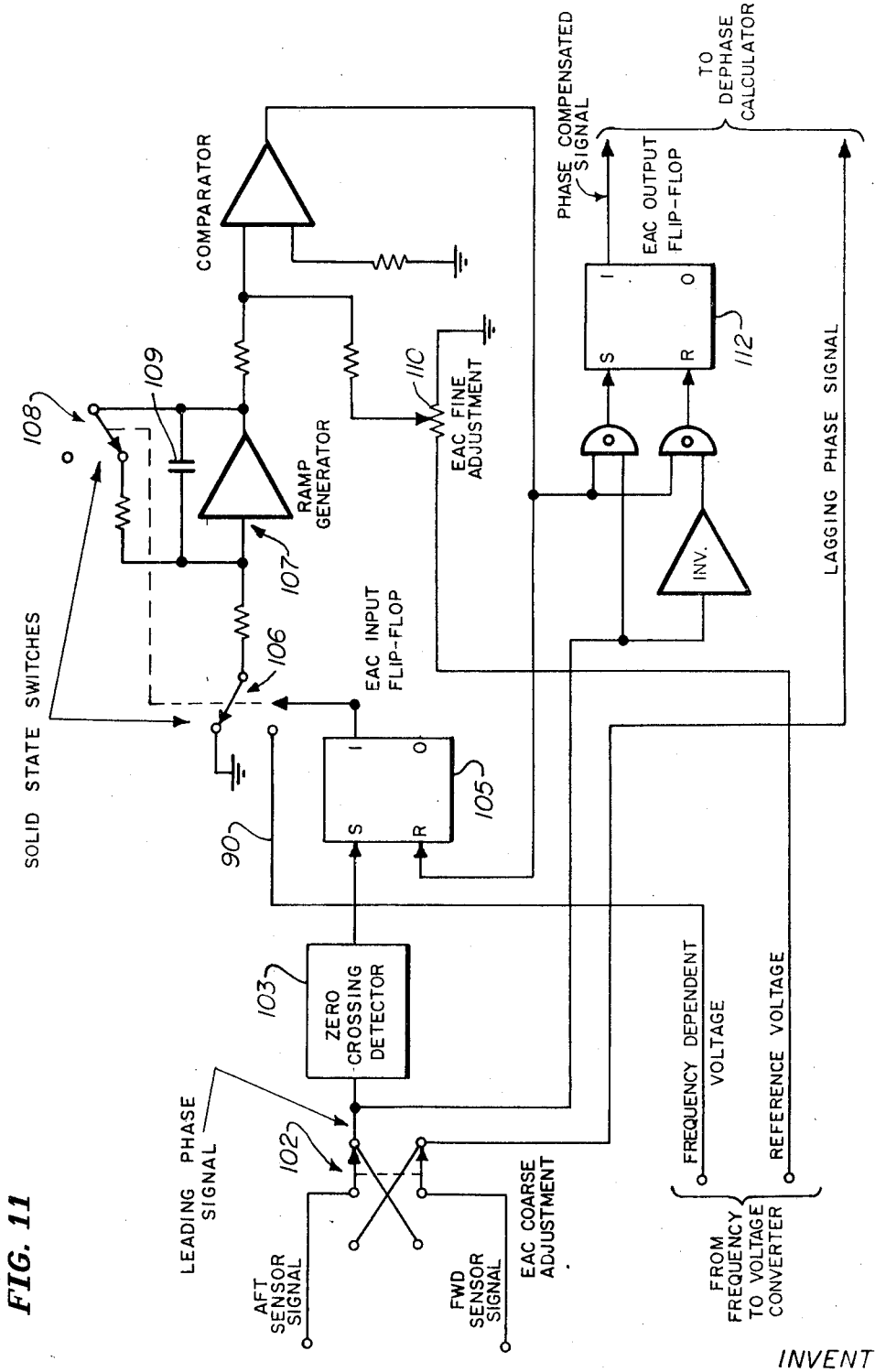
FIG. 11 is a schematic and functional circuit diagram of the electrical alignment compensator unit.

FIG. 11 is a schematic of the EAC. As shown, the EAC includes a coarse adjustment consisting of a DPDT switch 102 which is to be thrown into that position which causes the leading phase signal to enter a zero crossing detector 103. The lagging phase signal is allowed to pass to the output of the EAC unchanged. The leading phase signal is now delayed by an amount equal to that caused by mechanical misalignment in the following manner.

Figure 12:
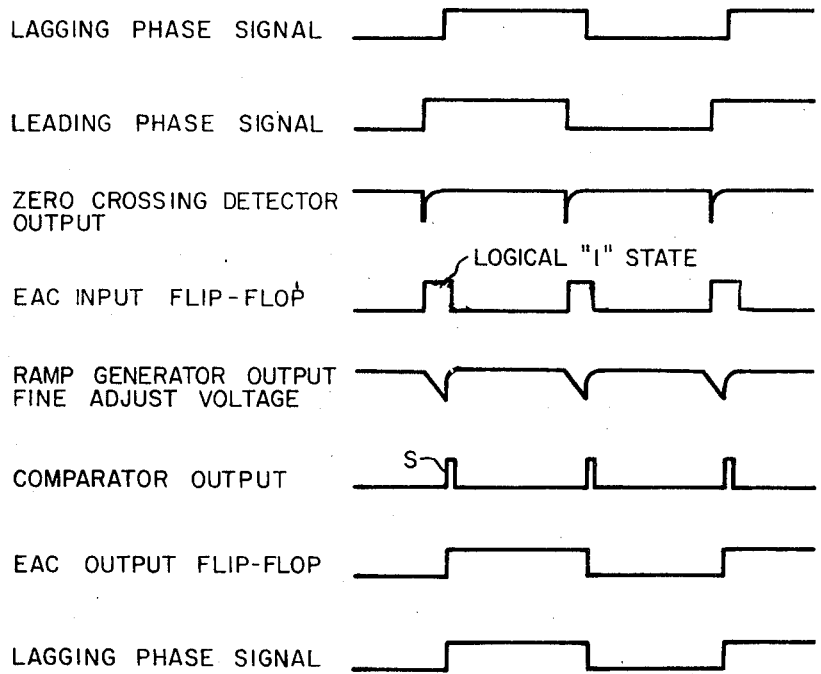
FIG. 12 is a timing diagram for the electronic alignment compensator.

As stated, the leading phase signal, as shown in FIG. 11, drives a zero crossing detector 103. This detector outputs a pulse train of negative pulses, each pulse corresponding to a transition T of the input square wave (as has been shown in the timing diagram of FIG. 12). The output from the zero crossing detector 103 then enters an EAC input flip-flop 105. Every pulse from the zero crossing detector 103 causes the EAC input flip-flop 105 to be brought to the logical "one" state (see FIG. 12). This, in turn, causes the input solid-state switch 106 to close thus supplying positive frequency dependent voltage along line 90 to the ramp generator 107. In addition, the output solid state switch 108 opens, thus allowing a feedback capacitor 109 of the ramp generator 107 to charge negatively. The switch 108 had previously been closed thus discharging the capacitor and forcing the output of the ramp generator to ground. The ramp generator 107 now charges linearly in the negative direction, as shown in FIG. 12, until it reaches a voltage equal in magnitude to that from the EAC fine adjustment potentiometer 110. At this time, the output of the comparator 111 changes state (as indicated in the timing diagram of FIG. 12 as point S) and thus causes:

1. the EAC output flip-flop 112 to be set or reset depending upon whether the present state of the leading phase signal is "one" or a "zero" respectively. It will be noted that this is a self-correcting arrangement which automatically eliminates any spurious noise pulses after a half-cycle of the leading phase signal;
2. the EAC flip-flop 105 to be reset which in turn causes the solid state switches 106, 108 to return to their original states and thus return the ramp generator 107 and comparator 111 to their initial starting conditions in preparation of receipt of the next transition of the leading phase signal.

It can now be observed that the leading phase signal may be phase delayed by an amount equal to that introduced by the mechanical misalignment. This delay is a constant phase delay notwithstanding variation in the rotor r.p.m. because of the use of the frequency dependent voltage which operates in the above-described electronics to vary the slope of the ramp generator output.

In a typical application, a 5° (mechanical) misalignment may be present due to the tolerances on relative Sensor position and relative Modulator Wheel position. As such, the two signals may be out of phase by as much as 105° (electrical) although the rotors are exactly synchronized. The two signals can be shifted relative to each other by a constant amount such that the signals delivered by the EAC to the subsequent electronics are in phase when the rotors are in phase by means of the course adjustment 102 and; fine adjustment potentiometer 110.

The course adjustment is made as follows. If the two signals are out of phase by more than 90° E, one signal is inverted. The phase shift between the inverted signal and that signal which was not inverted is now less than 90°. For example, if the two signals received by the Compensator are 150°E out of phase, inverting one signal reduces the phase difference to $$180°E - 150°E = 30°E$$

Hence, the fine adjustment will be required to compensate for a maximum of 90°E. Note that the use of such a Course/Fine adjustment system is capable of compensating for any amount of relative or absolute angular positioning of both the sensors and the Modulator Wheels.

DEPHASE CALCULATOR

Figure 13:
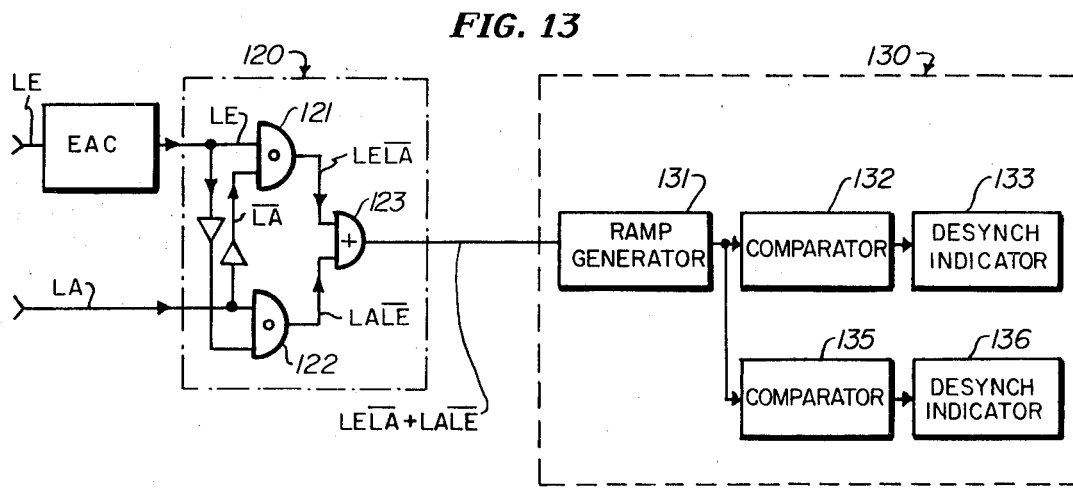
FIG. 13 is a schematic and functional diagram of the dephase calculator and alarm actuator control units.

The inputs of the dephase calculator are two signals, one from a sensor on the forward rotor and one from a sensor on the aft rotor, which have previously been compensated for mechanical misalignment by the EAC unit 100. The first step in measuring the phase difference in these two signals is to develop a signal which is proportional to their phase difference. As shown in FIG. 13, the dephase calculator comprises a series of logic circuits whose operation is to logically combine the output signals of the EAC together with the signals of the pulse train which had bypassed the EAC unit.

Figure 14:
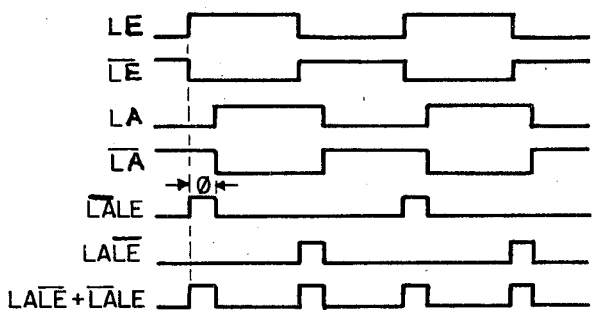
FIG. 14 illustrates the wave trains from the forward and aft rotors, their inversions, and the logical combination of these trains by the dephase calculator.

FIG. 14 illustrates the signal from the aft sensor assembly (assumed for the purposes herein to be the lagging wave train and labeled LA) and the forward sensor assembly (assumed herein to be the leading wave train and labeled LE) displaced in phase by an amount $\phi$. NOte that the magnitude of this phase difference is actually the actual mechanical phase difference multiplied by the number of reflecting surfaces of each modulator wheel element 12. Also shown in FIG. 14 are the inversions of these signals, labeled $\overline{LA}$ and $\overline{LE}$. As shown, the LA and $\overline{LE}$ signals are combined to form a LA$\overline{LE}$ signal, while the $\overline{LA}$ and LE signals are combined to form a $\overline{LA}$LE signal. Both the $\overline{LA}$LE and LA$\overline{LE}$ signals comprise pulse trains having pulse widths directly proportional to the electrical phase shift between the signals from the forward and aft sensors. As is apparent, both LA$\overline{LE}$ and $\overline{LA}$LE signals have identical properties except they are displaced 180° (electrical).

Referring to FIG. 13, the LE $\overline{LA}$ wave train is created by means of a logical AND gate circuit 121 having LE and $\overline{LA}$ wave trains as its inputs. Similarly, the LA $\overline{LE}$ wavetrain is created by means of a logical AND-gate circuit 122 having as its inputs an $\overline{LE}$ and LA pulse train. The outputs of logic gates 121, 122 are then fed to a logical OR-gate circuit 123, the output of which is the summation of the inputs, indicated as LE $\overline{LA}$ + LA $\overline{LE}$.

The output of the dephase calculator is then sent to the alarm actuator control 130 which operates to provide a "synch" signal wherever the mechanical desynchronization is less than a predetermined amount (for example, 0.1° mechanical) and to provide a "desynch" signal whenever the mechanical desynchronization exceeds a predetermined amount (for example, 4.5° mechanical). It will be appreciated that, because of the use of the inversions of the LA, LE signals, two solutions of the relative rotor phase difference may be obtained per chopping cycle i.e., per reflected beam).

As shown, the alarm actuator control 130 includes ramp generator 131 which is driven by the output of the dephase calculator 120. As stated, the pulse width of the signal from the dephase calculator is always proportional to the phase shift of the two rotors. This pulse, when applied to the ramp generator 131, causes a ramp voltage to be generated. It will be appreciated that the final value of the ramp voltage will be equal to the rotor phase shift. Such is accomplished over the varying speed range of the rotors through the utilization of frequency dependent voltage in the same manner as described above with reference to the ramp generator of the EAC.

The output of ramp generator 131 is sent to two comparators 132, 135. Comparator 132 compares the output of ramp generator to a voltage which corresponds to some predetermined rotor phase shift. If the ramp generator output ever exceeds this voltage, such indicates excessive rotor desynchronization and such is signaled by the output of comparator 132, which drives through appropriate circuitry, a desync indicator alarm 133.

The second comparator 135 compares the output of ramp generator 131 to a voltage which corresponds to a very small predetermined rotor phase shift. The output of this comparator drives, through appropriate circuitry, a sync indicator lamp 136. This lamp is illuminated whenever the indicated rotor desynchronization is in excess of the predetermined minimum.

It will be noted that when it's known that the rotors are turning such that they are exactly in synchronism, EAC can be adjusted until the sync indicating lamp is extinguished. At such time, the compensation will have been accomplished to within the tolerance as determined by comparator 135.

Thus, while preferred construction features of the invention are embodied in the structure illustrated herein, it is to be understood that changes and variations may be made by those skilled in the art without departing from the spirit and scope of the appended claims.

The embodiments of the invention in which an exclusive privilege or property is claimed are defined as follows:

1. Apparatus for detecting incidence of rotational desynchronization between a pair of body portions normally rotatable at the same instantaneous speed over a variable speed range and comprising: first means for generating separate first and second sequences of electrical pulses in response to rotary movement of each of said body portions, said first means includes means directing a beam of light energy at each of said rotating body portions and including separate optical transmitter means for each of the body portions, each of the transmitter means comprising a wide angle source of light energy, a magnification lens for condensing said light energy into a cone beam, and means providing a relatively thin aperture slit in registry with the central region of said cone and extending beyond the beam periphery, said optical transmitter means each being mounted adjacent a corresponding body portion so that the aperture slit is coplanar with the axis of the corresponding body portion, means connected to each of said portions for corresponding rotation therewith and positioned thereon to intercept and intermittently reflect the beam directed at each of said portions, and means responsive to the intermittently reflected light to provide said separate first and second sequences, second means responsive to said separate first and second sequences of electrical pulses to provide a third sequence of electrical pulses upon the occurrence of a difference in phase between said separate first and second sequences of electrical pulses, third means responsive to said third sequence of electrical pulses and to the instantaneous speed of rotation of said body portions to produce an output voltage having a value proportional to the amount of desynchronization between said body portions, and utilization means responsive to said output voltage.

2. Apparatus for detecting incidence of rotational desynchronization between a pair of body portions normally rotatable at the same instantaneous speed over a variable speed range and comprising: first means for generating separate first and second sequences of electrical pulses in response to rotary movement of each of said body portions, said first means includes means directing a beam of light energy at each of said rotating body portions, means connected to each of said portions for corresponding rotation therewith and positioned thereon to intercept and intermittently reflect the beam directed at each of said portions and including a separate modulator wheel element for each body portion, each wheel element having an external surface providing an annular array concentric of the axis of the corresponding body portion of equally spaced-apart reflection surfaces, each being of uniform size and each having opposite corner edges parallel to the axis of the corresponding body portion, said surfaces moving progressively through intercepting relation to said beam to reflect the same and form an optical square wave pulse train, and means responsive to the intermittently reflected light to provide said separate first and second sequences, second means responsive to said separate first and second sequences of electrical pulses to provide a third sequence of electrical pulses upon the occurrence of a difference in phase between said separate first and second sequences of electrical pulses, third means responsive to said third sequence of electrical pulses and to the instantaneous speed of rotation of said body portions to produce an output voltage having a value proportional to the amount of desynchronization between said body portions, and utilization means responsive to said output voltage.

3. Apparatus for detecting incidence of a predetermined degree of rotational desynchronization between a pair of body portions normally rotatable at the same instantaneous speed over a variable speed range and comprising: first means for generating separate first and second original sequences of electrical pulses in response to rotational movement of each of said body portions, said electrical pulses having an instantaneous pulse width proportional to the instantaneous speed of rotation of said body portions and corresponding to a predetermined angular region of said body portions, second means responsive to said separate first and second original sequences to provide a third sequence of electrical pulses having instantaneous pulse widths equal to the instantaneous difference in phase between the electrical pulses of said separate first and second original sequences and including means for generating separate first and second inverted sequences of electrical pulses corresponding, respectively, to said separate first and second original sequences of electrical pulses generated by said first means, means responsive to one of said separate first and second original sequences generated by said first means and to the one of said separate inverted sequences that corresponds to the other of said separate first and second original sequences generated by said first means to produce alternate ones of the pulses that comprise said third sequence, and means responsive to the other of said separate first and second original sequences generated by said first means and to the one of said separate inverted sequences that corresponds to said one of said separate first and second original sequences generated by said first means for producing the remainder of the pulses that comprise said third sequence whereby said third sequence includes a pair of successive pulses corresponding to each set of corresponding pulses of said separate first and second original sequences of electrical pulses generated by said first means, and third means responsive to the instantaneous pulse widths of said third sequence and the instantaneous speed of rotation of said body portions to produce an output voltage having a value proportional to the amount of rotational desynchronization between said body portions, and utilization means responsive to said output voltage when said output voltage exceeds a predetermined value.

4. Apparatus in accordance with claim 3 wherein said third means includes a ramp generator having a slope determining voltage input proportional to the speed of rotation of said rotating body portions.

5. In an apparatus for detecting incidence of rotational desynchronization between a pair of body portions normally rotatable at the same instantaneous speed over a variable speed range, first means for generating separate first and second original sequences of electrical pulses in response to rotary movement of each of said body portions, said first means generating electrical pulses of said separate first and second sequences with an instantaneous pulse width proportional to the instantaneous speed of rotation of said body portions and corresponding to predetermined angular segments of said body portions, and second means responsive to said separate first and second original sequences to provide a third sequence of electrical pulses upon the occurrence of a difference in phase between corresponding pulses of said separate first and second original sequences, said second means providing electrical pulses of said third sequence with an instantaneous pulse width equal to the instantaneous difference in phase between corresponding pulses of said separate sequences, and said second means including means for generating separate first and second inverted sequences of electrical pulses corresponding, respectively, to said separate first and second original sequences of electrical pulses generated by said first means, means responsive to one of said separate first and second original sequences generated by said first means and to the one of said separate inverted sequences that corresponds to the other of said separate first and second original sequences generated by said first means to produce alternate ones of the pulses that comprise said third sequence, and means responsive to the other of said separate first and second original sequences generated by said first means and to the one of said separate inverted sequences that corresponds to said one of said separate first and second original sequences generated by said first means for producing the remainder of the pulses that comprise said third sequence whereby said third sequence includes a pair of successive pulses corresponding to each set of corresponding pulses of said separate first and second original sequences of electrical pulses generated by said first means.

* * * * *